Inventors
Nicholas Kreekon
William H. Lane
By Warren F. B. Lindsley
Attorney

Inventors
Nicholas Kreekon
William H. Lane
by Warren F. B. Lindsley
Attorney 3,015,756
Patented Jan. 2, 1962

3,015,756

ENCLOSED SWITCHBOARD EMPLOYING SWITCH CARRIER FOR DISMANTLING TRANSFORMERS

Nicholas Kreekon and William H. Lane, Milwaukee, Wis., assignors to Allis-Chalmers Manufacturing Company, Milwaukee, Wis.

Filed Nov. 26, 1958, Ser. No. 776,507
3 Claims. (Cl. 317—103)

This invention relates to enclosed switchboard structures and more particularly to control equipment arranged therein.

Switchboard structures usually employ fixed circuit conductors such as bus bars, electric switches and accessory apparatus. The switches and some associated equipment are often mounted on carriers such as trucks which are moved into and out of suitable compartments arranged within the switchboard structure. Connections between the carrier supported switch and the fixed circuit conductors are established through disconnecting switches having their movable contact members carried by the carriers and their stationary contact members fixedly disposed within the rear compartments of the structures. In this type of structure the circuit terminals and apparatus associated therewith are isolated when the carrier is removed from its compartment within the structure and the switch and associated equipment carried thereby are electrically disconnected from the circuit. In order to protect an operator against contact with the fixed members of a disconnecting switch or live conductors associated therewith when he enters the carrier compartment, a shutter is disposed within the switchboard enclosure between the fixed contact of the disconnecting switch and its associated live conductors and the operator.

The mounting of energized control equipment in front of or behind a shutter arrangment in an enclosed switchboard structure makes it difficult and hazardous to test or service this equipment. To mount this equipment in front of the shutter arrangement would make servicing and testing easy but would reduce the operator's safety. Therefore, a need exists for enclosed switchboard structures wherein electrical control equipment such as, for example, current transformers can be mounted within an exposed switch compartment or behind a shutter arrangement in the structure but be rendered harmless whenever the switch compartment is opened and the movable carrier supporting the switching structure is removed.

In accordance with the invention claimed a new and improved enclosed switchboard structure is provided. A carrier is mounted for movement into and out of a compartment in the switchboard structure and has mounted thereon on a current conducting stud one of a pair of cooperating electrical contacts used for controlling an electric circuit. A transformer is mounted within the switchboard structure either in front of or behind a shutter arrangement and comprises a coil. The coil is mounted in the path of movement of the stud such that the stud upon movement of the carrier into the compartment of the switchboard structure passes through the coil and becomes the primary conductor of the transformer.

It is, therefore, one object of this invention to provide a new and improved enclosed switchboard structure.

Another object of this invention is to provide a new and improved enclosed switchboard structure employing control equipment which is physically taken apart during removal of a carrier from the structure to deenergize the equipment.

A further object of this invention is to provide a new and improved enclosed switchboard structure in which a shutter is interposed between the live conductors and a coil of a current transformer when a carrier is moved out of a compartment to physically take apart and deenergize the current transformer.

A still further object of this invention is to provide a new and improved enclosed switchboard structure wherein control equipment used therein is assembled and disassembled by movement of a switch carrier into and out of the switchboard structure.

A still further object of this invention is to provide a new and improved enclosed switchboard structure wherein control equipment arranged in front of or behind a movable shutter is assembled and dismantled by movement of a switch carrier into and out of the switchboard structure.

A still further object of this invention is to provide a switchboard enclosure in which the movable carrier structure forms a part of the control equipment fixedly arranged within the enclosure.

Objects and advantages other than those above set forth will be apparent from the following description when read in connection with the accompanying drawings, in which.

Figures 1, 2, 3, 8:
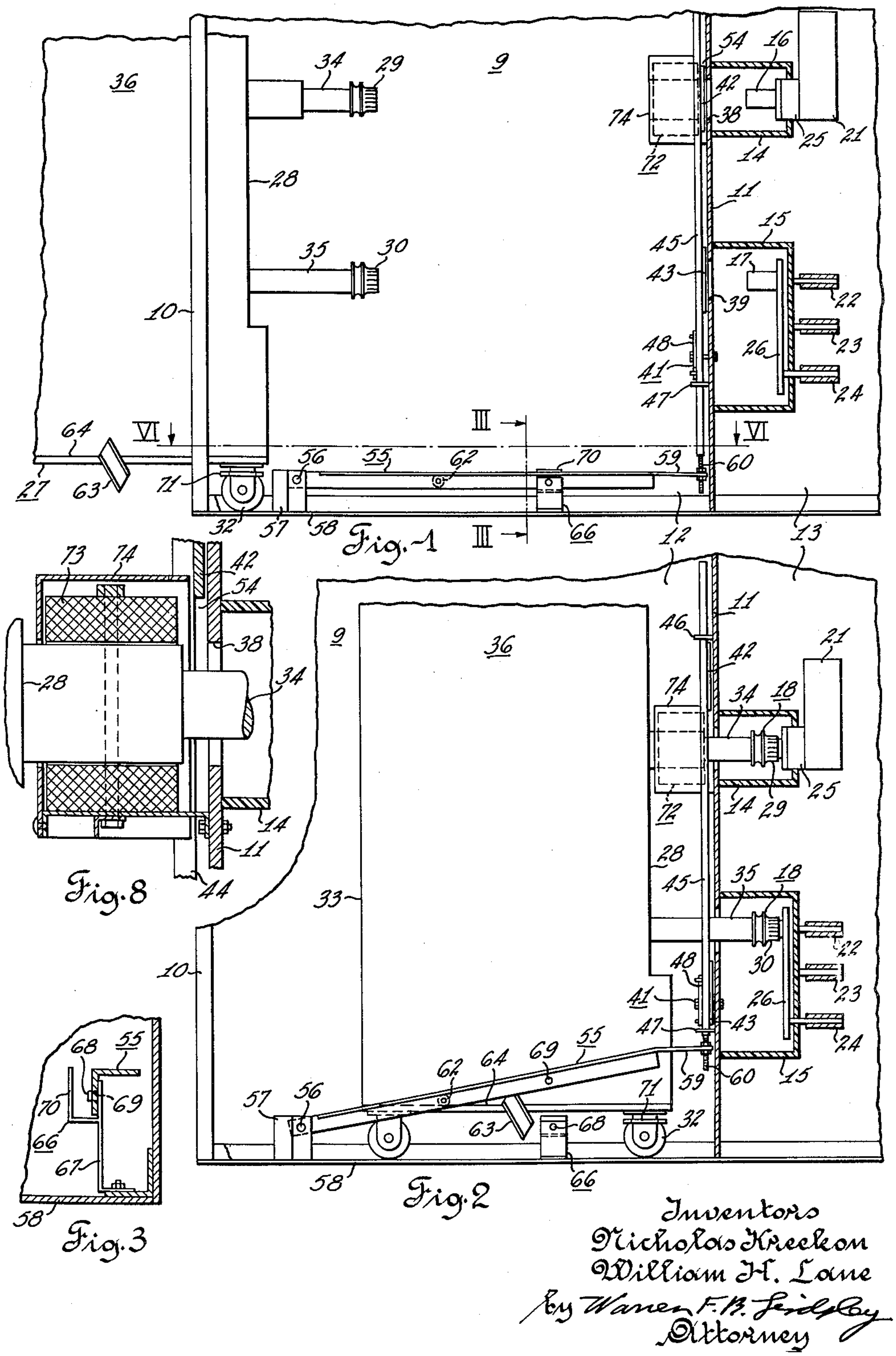
FIG. 1 is a side sectional elevational view of an enclosed switchboard and a removable truck with its associated mechanism in partially withdrawn position and embodying the invention.
FIG. 2 is a side sectional elevational view similar to to FIG. 1 with the truck in fully racked in position.
FIG. 3 is a cross sectional view taken along the line III—III in FIG. 1 showing details of the shutter locking mechanism.
FIG. 8 is an enlarged partial cross sectional view of one of the current transformers illustrated in FIG. 2 illustrating the stud of the barrier forming the primary conductor of the transformer.

Referring to the drawings by characters of reference, FIG. 1 illustrates an enclosed switchboard structure comprising a housing 9 formed of a front upright surface 10 and a rearwardly spaced upright surface 11 with suitable plates attached to surfaces 10 and 11 to enclose the space of a first compartment 12 therein and rearward of surface 11 to enclose the space of a second compartment 13. Upright surface 11 supports a pair of housing elements 14 and 15. A plurality of pairs of stationary contact members 16 and 17 are enclosed by housing elements 14 and 15 and comprise the fixed contact members of a disconnecting switch 18. Contact members 16 and 17 are electrically connected to two of a plurality of bus bars 21, 22, 23 and 24 through suitable connectors 25 and 26. Although in general enclosed switchboards are provided with a plurality of similar pole structures one for each phase of a polyphase electric circuit (note FIGS. 4 and 5) only one such pole structure is illustrated in the side elevational view shown in FIGS. 1 and 2.

A movable carrier such as a truck 27 is arranged for movement into and out of the enclosed switchboard structure 9. This truck comprises a framework 28 adopted to support movable contacts 29 and 30 of disconnecting switch 18. Truck 27 is mounted on supporting wheels 32 by which it may be moved into and withdrawn from its enclosing compartment 12. A vertical panel 33 is carried by the truck on the forward face thereof and when the truck is in service position within the switchboard enclosure it forms substantially the closure for the truck compartment. An electric switch such as an air magnetic circuit breaker symbolically shown by a reference character 36 may be carried by the truck frame in the rear of panel 33.

A plurality of insulated studs or conductors 34 and 35, here shown as vertically aligned, are carried by the truck frame 28 and are disposed in approximate horizontal alignment with the stationary contact members 16 and 17 of the disconnecting switch 18. These conductors are provided with contact members 29 and 30 at their ends which members are suitably connected electrically with the terminals of the air magnetic circuit breaker 36. When truck 27 is in service position within compartment 12 in the enclosed switchboard structure, as shown in FIG. 2, the movable contact members 29 and 30 are adopted to engage the fixed contact members 16 and 17 of the disconnecting switch 18. When truck 27 is withdrawn from the enclosed switchboard structure contact members 16, 29 and 17, 30 are separated thereby disconnecting the air magnetic circuit breaker or other switching device usually mounted on frame 28 of truck 27 from the electric circuit.

Figure 4:
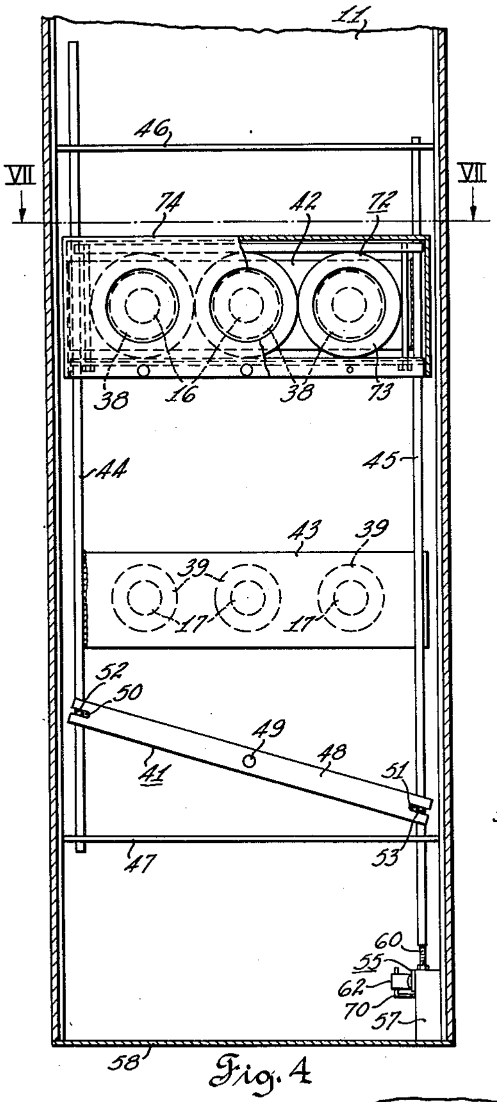
FIG. 4 is a left end elevational view of the enclosed switchboard structure shown in FIGS. 1 and 2 with the truck removed and the shutter shown in closed position.
Figure 5:
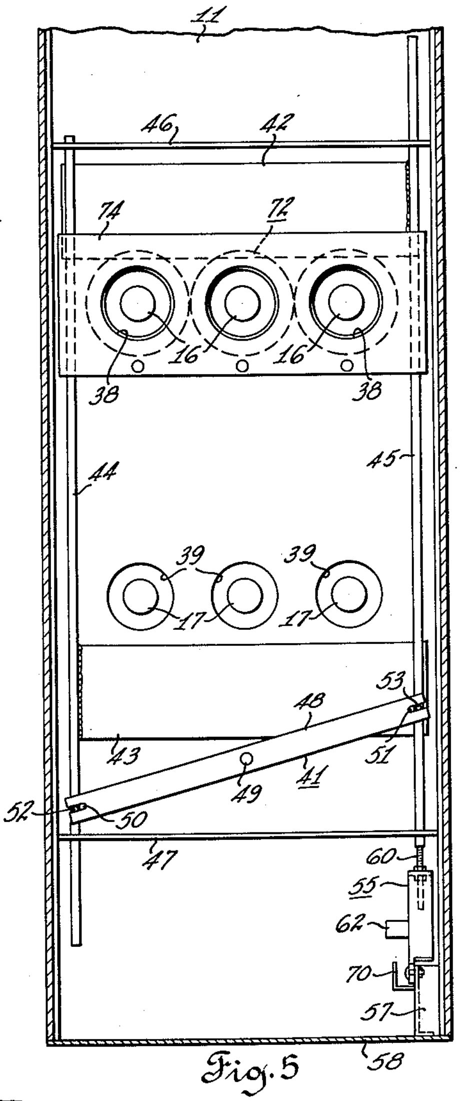
FIG. 5 is a left end elevational view of the enclosed switchboard structure shown in FIGS. 1 and 2 with the truck removed and the shutter shown in open position.

The stationary contact members 16 and 17 of the disconnecting switch 18 and also the circuit conductors 25 and 26 arranged within compartment 13 are separated from the truck compartment 12 by the upright surface 11 which is disposed in spaced relationship in front of stationary contact members 16 and 17. Upright surface 11, as shown in FIGS. 4 and 5, are provided with pairs of apertures 38 and 39 through which conductors 34 and 35 and the supported contact members 29 and 30 carried by truck 27 may be extended to make contact with the stationary contact members 16 and 17.

A shutter 41 is provided to move into shutter closed position to cover apertures 38 and 39 before truck 27 is completely withdrawn from compartment 12 and to move into shutter open position to uncover apertures 38 and 39 before truck 27 is moved completely into its service position within its compartment 12. Shutter 41 comprises a pair of vertically spaced reciprocally mounted plates or blades 42 and 43, which are connected in a counterbalancing arrangement for minimizing the force required for actuation thereof. One of the blades moves upward against the effect of gravity while the other blade simultaneously moves downwardly under the effects of gravity. When the shutter is actuated to shutter open position blade 42 is moved above apertures 38 and blade 43 is moved below apertures 39 as shown in FIG. 5. When the shutter is actuated to shutter closed position blades 42 and 43 are moved over apertures 38 and 39, respectively, as shown in FIG. 4, to prohibit entrance thereto.

One end of each of the lateral edges of blades 42 and 43 are fixedly attached to a different one of a pair of slidably mounted vertically extending rods 44 and 45. Rods 44 and 45 are slidably mounted in cross members 46 and 47 which members form a part of the frame of the switchboard housing 9 and are supported by rod 48 pivotally mounted at 49 to housing 9. Rod 48 is provided at each end along the longitudinal axis thereof with slots 50 and 51 which provide a loose connection with pins 52 and 53 on rods 44 and 45, respectively, so that rod 48 may be rotated causing the reciprocating movement of rods 44 and 45. As rod 48 is rotated clockwise, rod 44 moves upward to move blade 43 over apertures 39 and rod 45 moves downward causing blade 42 to cover apertures 38. The left end of blade 42 and the right end of blade 43 are loosely arranged in a slot or track 54 formed between rods 44 and 45 and upright surface 11.

The shutter operating mechanism comprises a lever 55 pivotally mounted at 56 to a bracket 57 secured to base 58 on one side of the truck compartment. The rear end 59 to lever 55 is loosely connected to a pin 60 extending from the lower end of rod 45. Reciprocating movement of lever 55 causes reciprocating movement of rod 45. Movement of rod 45 causes pivotal movement of rod 48 and pivotal movement of rod 48 causes reciprocal movement of rod 44. Lever 55 is actuated by movement of truck 27 into and out of the truck compartment and is provided with a roller 62 journaled on a shaft mount on the outer side thereof. Roller 62 engages with a guiding track, slot or cam follower 63 mounted on truck 27. As roller 62 engages cam follower 63 it moves along the slot therein until the roller reaches a horizontal surface or cam plate 64 on truck 27. Cam plate 64 extends laterally from the body of truck 27 and is disposed to provide a bearing surface for roller 62 during a predetermined movement of truck 27. During the movement of roller 62 through the slot of cam follower 63 lever 55 is rotated counterclockwise, as shown in FIG. 5, raising rod 45 thereby causing shutter 41 to move to shutter open position. When truck 27 is removed from the truck compartment roller 62 is caused to roll along surface 64 until it reaches the slot of cam follower 63. Upon reaching cam follower 63 roller 62 moves through this slot to a lower level thereby rotating lever 55 clockwise, as shown in FIG. 4, to shutter closed position.

Figure 6:
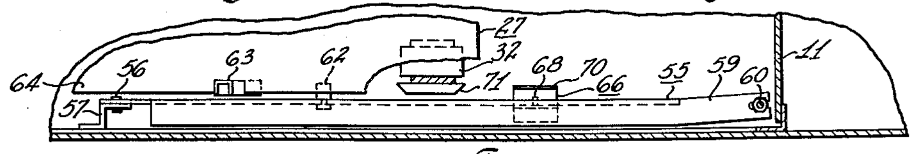
FIG. 6 is a cross sectional view of the structure shown in FIG. 1 taken along the line VI—VI with the truck moved further toward switch engaging position.
Figure 7:
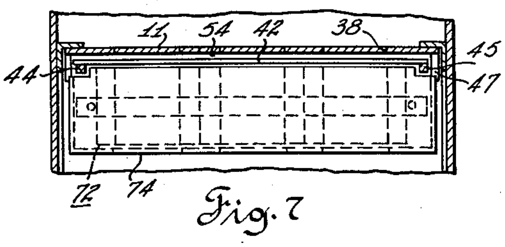
FIG. 7 is a cross sectional view of the structure shown in FIG. 4 taken along the line VII—VII.

Lever 55 is provided with a locking mechanism 66 for keeping it in a horizontal position when the truck is out of its compartment. This locking mechanism, as more clearly shown in FIG. 3, comprises a flexible latch or lever 67 fixedly secured to the base 58 of the truck compartment and arranged juxtaposed to lever 55. Lever 67 is provided with a lug 68 which extends transversely therefrom to extend within an aperture 69 in lever 55 when lever 55 is in a horizontal shutter closed position. A protrusion 70 mounted on lever 67 is so arranged that it engages a cam surface 71 on the base of truck 27 (note FIG. 6) which cam surface when moving past protrusion 70 moves it and lever 67 to the right, as shown in FIG. 3, against the biasing effect of lever 67 forcing lug 68 out of aperture 69 in lever 55. Lever 55 is thereby released for movement under the effects of truck 27.

FIGS. 1–4, 7 and 8 illustrate a plurality of current transformers 72 mounted in the truck compartment against the upright surface 11. These transformers each comprise an apertured coil 73 arranged around and juxtaposed to a different one of the apertures 38. Although current transformers 72 are shown only around apertures 38 they may be positioned also around apertures 39. Blade 42 of shutter 41 is arranged to move between coils 73 and apertures 38 within the truck compartment. Coils 73 are so aligned that when conductor 34 together with movable contacts 29 and 30, pass therethrough upon truck 27 being moved into the truck compartment conductor 34 becomes the primary conductor of the current transformers 72. As shown in the drawings coils 73 are covered with a metallic barrier 74 which is bolted to upright surface 11 and may be easily removed for access to the coils of transformers 72.

These current transformers may be, for example, of the toroidal or window type of high quality core steel which is spirally wound with compensated fully distributed secondary windings. Transformers 72 may be mounted on either the bus, load or bus and load sides of the switchboard depending on the requirements of the particular application. By mounting the shutter 41 for operation between the coils 73 and the upright surface 11 it is possible to test them without removing them from the enclosed switchboard structure while maintaining maximum operator safety since removal of the circuit breaker on truck 27 automatically removes the primary conductors of transformers 72 and closes off the high voltage bus compartment from the truck compartment.

FIG. 8 shows in detail the cooperation of the conductor or stud 34 which supports the movable contact 16 with the coil 73 of the current transformer 72. Conductor 34 when in carrier racked in position forms the primary conductor of the current transformer and when the carrier is removed from its switchboard compartment it physically takes apart the current transformer by removing its primary conductor to deenergize the transformer thereby rendering it harmless. It is obvious from the drawings that removal of the carrier from the switchboard structure would render current tansformer 72 harmless regardless of whether the current transformer was in front of or behind the upright surface 11.

A complete cycle of operation of the shutter structure is as follows:

The shutter blades 42 and 43 are in shutter closed position as the truck 27 is rolled into the truck compartment 12 of the enclosed switchboard structure. As truck 27 moves into the truck compartment cam surface 71 engages protrusion 70 and forces lug 68 out of aperture 69 in lever 55 thereby releasing lever 55 for actuation. Part way in the truck compartment after release or unlocking of lever 55 roller 62 on lever 55 engages cam follower 63 and it is forced to ride up the track in follower 63 and along cam plate 64 on truck 27. This action elevates shutter lift lever 55 which pivots about pivot 56. Counterclockwise rotation of lever 55 lifts rod 45 vertically. Although lever 55 moves in arc whose center is at pivot 56 the loose joining of lever 55 to rod 45 results in vertical straight line travel of rod 45. As rod 45 is raised up rod 48 loosely connected thereto pivots counterclockwise about pin 49 and results in a downward movement of rod 44. As rod 45 and shutter blade 42 move upward rod 44 and shutter blade 43 move downward. This positive and substantially simultaneous action results in blades 42 and 43 exposing apertures 38 and 39 and being locked in that position by the frame of truck 27.

As truck 27 is racked in whereby conductors 34 and movable contacts 29 pass through apertures 38 to engage the stationary contacts 16, conductors 34 pass through coils 73 of transformer 72 to physically complete the transformer structures and to energize them upon current flow through conductors 34.

As truck 27 is withdrawn from the truck compartment the above action is reversed. Roller 62 rides along cam plates 64 and down the track in cam follower 63. This causes clockwise rotation of lever 55 and the raising of rod 44 and shutter blade 43 and the lowering of rod 45 and shutter blade 42 to close apertures 39 and 38, respectively. Removal of truck 27 from its compartment physically removes conductors 34 from within coils 73 of current transformers 72 thereby taking apart the transformers and in turn not only deenergizing and rendering them harmless but also making it impossible to energize them without providing primary conductors.

The shutter blades are moved to closed position during the short travel of roller 62 along cam follower 63. This means that the shutter is locked closed whenever the circuit breaker on truck 27 is in the disconnected position. Movement of shutter 41 does not depend on gravity, particularly the closing operation, but is substantially a positive action resulting from the cooperation of parts of the truck and switchboard structure.

Although but one embodiment of the present invention has been illustrated and described it will be apparent to those skilled in the art that various changes and modifications may be made therein without departing from the spirit of the invention or from the scope of the appended claims.

Having now particularly described and ascertained the nature of our said invention and the manner in which it is to be performed, we declare that what we claim is:

1. An enclosed switchboard having a pair of communicating compartments, a shutter controlling communication between said compartments and movable between open and closed positions, said shutter comprising a pair of reciprocally mounted blades, means for connecting said blades together in a counterbalancing arrangement for minimizing the force required for actuation thereof, a carrier movable into and out of one of said compartments, an electric switch, said switch comprising a relatively movable contact mounted on a stud arranged on said carrier and a relatively stationary contact mounted within the other of said compartments, a current transformer, said transformer comprising a coil mounted within said one of said compartments adjacent said shutter and within the path of movement of said stud whereby said stud upon movement of said carrier into said one of said compartments passes through said coil and becomes the primary conductor of said transformer, said shutter being arranged between said coil and said communication between said compartments, and a shutter operating mechanism having means interlocking with said carrier for actuating said blades to shutter open position and locking said blades in shutter open position upon movement of said carrier into said one of said compartments and actuating said blades to shutter closed position and locking said blades in shutter closed position upon movement of said carrier out of said one of said compartments.

2. An enclosed switchboard having a truck compartment and a conductor compartment, a shutter controlling communication between said compartments and movable between open and closed positions, said shutter comprising a pair of reciprocally mounted blades, means for connecting said blades together in a counterbalancing arrangement for minimizing the force required for actuation thereof, a truck movable into and out of said truck compartment, an electric switch, said switch comprising a relatively movable contact mounted on a stud arranged on said truck and a relatively stationary contact mounted within said conductor compartment, a current transformer, said transformer comprising a coil mounted within said truck compartment adjacent said shutter and within the path of movement of said stud whereby said stud upon movement of said truck into said truck compartment passes through said coil and becomes the primary conductor of said transformer, said shutter being arranged between said coil and said communication between said compartments, and a shutter operating mechanism having means interlocking with said truck for actuating said shutter upon movement of said truck into and out of said truck compartment, said interlocking means comprising a latch for holding said shutter closed when said truck is out of said truck compartment.

3. An enclosed switchboard having a truck compartment and a conductor compartment, a shutter controlling communication between said compartments and movable between open and closed positions, said shutter comprising a pair of reciprocally mounted blades, means for connecting said blades together in a counterbalancing arrangement for minimizing the force required for actuation thereof, a truck movable into and out of said truck compartment, an electric switch, said switch comprising a relatively movable contact mounted on a stud arranged on said truck and a relatively stationary contact mounted within said conductor compartment, a current transformer, said transformer comprising a coil mounted within said truck compartment adjacent said shutter and within the path of movement of said stud whereby said stud upon movement of said truck into said truck compartment passes through said coil and becomes the primary conductor of said transformer, said shutter being arranged between said coil and said communication between said compartments, and a pivotally mounted shutter operating mechanism arranged within said truck compartment and having roller means engaging and interlocking with said truck for actuating said blades to shutter open position upon movement of said truck into said truck compartment and disengaging with said truck and actuating said blades to shutter closed position and locking said blades in shutter closed position upon movement of said truck out of said truck compartment.

References Cited in the file of this patent

UNITED STATES PATENTS

| | | |
|---|---|---|
| 1,729,864 | Brown | Oct. 1, 1929 |

FOREIGN PATENTS

| | | |
|---|---|---|
| 386,000 | Great Britain | Jan. 9, 1933 |
| 438,225 | Great Britain | Nov. 13, 1935 |

OTHER REFERENCES

Westinghouse Elec. & Manuf. Co., "Plant Distribution Systems," pp. 52–55, September 1941.